United States Patent
Jangam et al.

(10) Patent No.: US 10,944,646 B2
(45) Date of Patent: Mar. 9, 2021

(54) ENABLING MULTIPLE PROVIDER SOFTWARE DEFINED NETWORK PROGRAMMING USING BLOCKCHAIN DISTRIBUTED LEDGERS

(71) Applicant: Cisco Technology, Inc., San Jose, CA (US)

(72) Inventors: Anil Bhikuayya Jangam, Milpitas, CA (US); Om Prakash Suthar, Bolingbrook, IL (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 16/172,757

(22) Filed: Oct. 27, 2018

(65) Prior Publication Data
US 2020/0136932 A1  Apr. 30, 2020

(51) Int. Cl.
| | | |
|---|---|---|
| *G06F 15/177* | (2006.01) | |
| *H04L 12/24* | (2006.01) | |
| *H04L 9/06* | (2006.01) | |
| *H04L 12/715* | (2013.01) | |
| *H04L 12/66* | (2006.01) | |

(Continued)

(52) U.S. Cl.
CPC .......... *H04L 41/5054* (2013.01); *G06F 16/27* (2019.01); *G06Q 20/382* (2013.01); *H04L 9/0643* (2013.01); *H04L 12/66* (2013.01); *H04L 41/5019* (2013.01); *H04L 45/64* (2013.01); *H04L 2209/38* (2013.01)

(58) Field of Classification Search
USPC ........................................................ 709/220
See application file for complete search history.

(56) References Cited

U.S. PATENT DOCUMENTS

| | | | | | |
|---|---|---|---|---|---|
| 7,840,227 | B2 * | 11/2010 | Kahlert | ................. | H04W 36/32 |
| | | | | | 455/456.2 |
| 9,992,040 | B2 * | 6/2018 | Kim | .................... | H04L 12/4633 |
| 10,084,642 | B2 * | 9/2018 | Goldfarb | ............. | H04L 12/4633 |

(Continued)

OTHER PUBLICATIONS

Atchison Frazer, "Is There a Future for Blockchain-Enabled SD-Wan?," [Abstract Only] [Accessed Online Oct. 26, 2018] https://ieeexplore.ieee.org/abstract/document/8360846.

(Continued)

*Primary Examiner* — Alicia Baturay
(74) *Attorney, Agent, or Firm* — Patterson + Sheridan, LLP

(57) ABSTRACT

The disclosure provides a secure and scalable approach for (a) exchanging, between a first network and a second network, provisioning requirements of a user device, (b) executing a smart contract that includes the provisioning requirements, and (c) connecting the user device to one of the networks. The method comprises connecting the user device to a first network, and connecting the first and second networks through a scalable blockchain network. The method further comprises sending a smart contract, by the first network to the second network, through the blockchain network. The second network either accepts or rejects the contract. If the second network accepts, then the user device connects to the second network and the second network provides network services to the user device. The provided network services comply with the conditions or parameters of the smart contract.

19 Claims, 4 Drawing Sheets

(51) Int. Cl.
*G06Q 20/38* (2012.01)
*G06F 16/27* (2019.01)

(56) References Cited

U.S. PATENT DOCUMENTS

| | | | | |
|---|---|---|---|---|
| 10,095,878 | B2* | 10/2018 | Goldfarb | G06F 21/602 |
| 10,111,163 | B2* | 10/2018 | Vrzic | H04W 28/0247 |
| 10,129,097 | B2* | 11/2018 | Beecham | H04L 41/12 |
| 10,230,605 | B1* | 3/2019 | Filsfils | H04L 12/44 |
| 10,255,458 | B2* | 4/2019 | Aunger | G06F 21/602 |
| 10,362,517 | B2* | 7/2019 | Crawford | H04L 9/0643 |
| 10,397,098 | B2* | 8/2019 | Song | H04L 45/38 |
| 10,452,776 | B2* | 10/2019 | Anderson | G06Q 50/18 |
| 10,452,824 | B2* | 10/2019 | Egner | H04L 9/3239 |
| 10,476,789 | B2* | 11/2019 | Halligan | H04L 12/6418 |
| 10,476,799 | B2* | 11/2019 | Chung | H04L 45/64 |
| 2016/0254984 | A1* | 9/2016 | Tekalp | H04L 45/02 709/242 |
| 2018/0197156 | A1* | 7/2018 | Beesley | H04L 12/1485 |
| 2019/0089155 | A1* | 3/2019 | Cui | G06Q 10/00 |
| 2019/0188699 | A1* | 6/2019 | Thibodeau | G06Q 20/3827 |
| 2019/0188700 | A1* | 6/2019 | August | H04L 9/3239 |
| 2019/0188701 | A1* | 6/2019 | Parsons | H04L 9/3239 |
| 2020/0059353 | A1* | 2/2020 | Liu | H04L 9/0637 |
| 2020/0067774 | A1* | 2/2020 | Saltsgaver | H04L 9/3268 |
| 2020/0076891 | A1* | 3/2020 | Stuart | H04L 9/3239 |
| 2020/0134608 | A1* | 4/2020 | Gluck | G06Q 20/40145 |
| 2020/0134620 | A1* | 4/2020 | Aiello | H04W 4/24 |
| 2020/0136932 | A1* | 4/2020 | Jangam | H04L 45/64 |
| 2020/0145417 | A1* | 5/2020 | Larish | H04L 63/0876 |
| 2020/0159634 | A1* | 5/2020 | Gadgil | G06F 11/1464 |
| 2020/0167342 | A1* | 5/2020 | Shin | H04L 41/0896 |

OTHER PUBLICATIONS

Stichen et al, "Chainguard—A Firewall for Blockchain Applications Using SDN With Openflow," [Abstract Only] [Accessed Online on Oct. 26, 2018] https://ieeexplore.ieee.org/document/8169748.

Sharma et al, "Secure and Energy-Efficient Handover in Fog networks using Blockchain-Based DMM," [Abstract Only] [Accessed Online Oct. 25, 2018] https://ieeexplore.ieee.org/abstract/document/8360846.

Sadhu Ram Basnet and Sadhu Ram Basnet, "BSS: Blockchain security over software defined network," [Abstract only] [Accessed Online Oct. 25, 2018] https://ieeexplore.ieee.org/document/8229910/authors#authors.

* cited by examiner

ENABLING MULTIPLE PROVIDER SOFTWARE DEFINED NETWORK PROGRAMMING USING BLOCKCHAIN DISTRIBUTED LEDGERS

TECHNICAL FIELD

Embodiments presented in this disclosure generally relate to exchanging user service requirement data between networks using a distributed blockchain network, executing a smart contract, and connecting the user to one of the networks.

BACKGROUND

A provider of network services (i.e., a network service provider) typically has an end-to-end service level agreement (SLA) with its customers. The SLA describes service parameters that are to be provided to the customer, such as for example, expected downlink and uplink data transfer speeds, quality of services, service uptime, and allowed failures or interruptions. The network services may be provided either only within the network of the network service provider, or the network services may be provided by networks that include networks of at least one other second network provider. The first provider and second provider may have an agreement that allows customers of the first provider to use the network of the second provider, under certain circumstances. Before connecting a customer to the network of the second provider, the first provider typically transmits the customer SLA or parameters that represent the SLA to the second provider. The second provider uses the received SLA to reprogram its network so as to provide network services to the customer. To transmit the SLA from the first provider to the second provider, a secure and scalable method of transmitting the SLA is needed. However, current methods of transmitting SLA parameters between providers are not sufficiently secure or scalable.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method of connecting a device to a second network, the device being connected to a first network, the method comprising connecting to a blockchain network, wherein the blockchain network comprises a distributed blockchain. The method further comprises sending to the blockchain network a request to connect the device to the second network while the device is connected to the first network, wherein the request comprises a smart contract and the smart contract comprises network provisioning requirements of the device. The method further comprises sending the request from the blockchain network to the second network, adding to the distributed blockchain a block comprising the smart contract, and connecting the device to the second network.

Further embodiments include a non-transitory computer-readable storage medium storing instructions that, when executed by a computer system, cause the computer system to perform the method set forth above, and a computer system programmed to carry out the method set forth above.

EXAMPLE EMBODIMENTS

The present disclosure provides a secure and scalable approach for (a) exchanging, between a first network and a second network, provisioning requirements of a user device, (b) executing a smart contract that includes the provisioning requirements, and (c) connecting the user device to one of the networks. The method comprises connecting the user device to a first network, and connecting the first and second networks through a scalable blockchain network. The method further comprises sending a smart contract, by the first network to the second network, through the blockchain network. The second network either accepts or rejects the contract. If the second network accepts, then the user device connects to the second network and the second network provides network services to the user device. The provided network services comply with the conditions or parameters of the smart contract.

Figure 1:
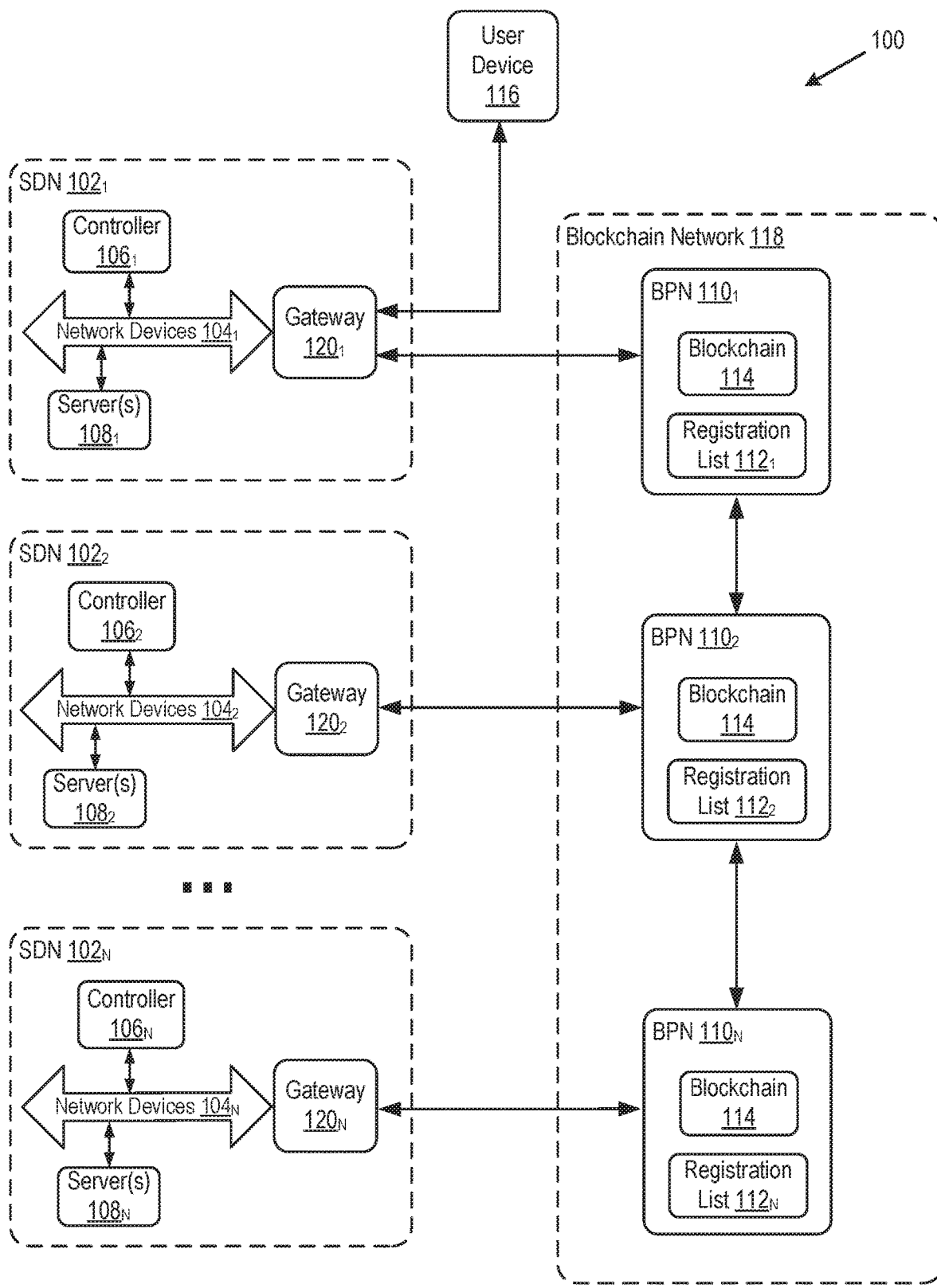
FIG. 1 depicts a block diagram of a computing system in which one or more embodiments of the present disclosure may be utilized.

FIG. 1 depicts a block diagram of a computing system 100 in which one or more embodiments of the present disclosure may be utilized. Computing system 100 includes software defined networks (SDNs) 102$_1$-102$_N$ (collectively referred to as SDNs 102 and individually referred to as SDN 102), a blockchain network 118, and a user device 116. Each SDN 102 is connected to blockchain network 118 through a direct link, a LAN, a wide area network (WAN) such as the Internet, a telephone network, another type of network, or a combination of these.

The user device 116 may be any type of computing device, such as a desktop computer, a laptop, a mobile phone, a tablet computer, or a data center gateway. Although the user device 116 is shown as connected to SDN 102$_1$, the user device 116 may be connected to any one of the SDNs 102. Although only one user device 116 is shown in FIG. 1, many user devices 116 may be connected to each of the SDNs 102.

Each of the SDNs 102 include a controller 106, network devices 104, one or more servers 108, and a gateway 120. Although the SDN 102 is described as a "software defined" network, the SDN 102 may be any type of network, consistent with the teachings herein. The network devices 104 may be physical or virtual devices, and may be, for example, switches or switch-routers. Network devices 104 may be organized in a fabric of spine and leaf switches or switch-routers, which communicatively connect the servers 108. In an embodiment, each SDN 102 is a separate network, controlled and managed by a separate network service provider. For example, each SDN 102 may be a different network service provider, such as a telecommunication company or a data center service provider. In this embodiment, each SDN 102 is a separate administrative domain, administrated by a separate network service provider.

In an embodiment, the server 108 is a physical machine comprising an operating system, central processing unit, memory, network interface card (NIC), and a storage. In another embodiment, the server 108 is a virtual appliance, such as a virtual machine or a container, executing on a host machine comprising virtualization software, such as a hypervisor or a virtual machine monitor (VMM). In a third embodiment, the servers 108 are a combination of physical machines and virtual appliances.

The gateway 120 provides an entry for network traffic into and out of the SDN 102. The gateway 120 may provide services such security and network address translation for the SDN 102. The gateway 120 may be a physical or a virtual appliance, or a software service running within the server(s) 108.

The controller 106 is a management module for controlling and configuring components within the SDN 102 that contains the controller 106. The controller 106 may be a physical or a virtual appliance, a software service running on one of the servers 108, or a software service distributed throughout the servers 108. The controller 106 registers with and communicates with blockchain network 118, as described with reference to FIG. 3, below.

The blockchain network 118 is a network of one or more blockchain provider nodes (BPNs) $110_1$-$110_N$ (collectively referred to as BPNs 110 and individually referred to as BPN 110). The BPN 110 may be a physical device or a virtual appliance (e.g., virtual machine). The BPNs 110 are connected to one another directly, or may be connected indirectly through another BPN 110 or through another device such as a router or a switch. The BPNs 110 may be connected through a network, such as a LAN, WAN (e.g., Internet), a telephone network, another type of network, or a combination of these. The blockchain network 118 is scalable by adding or removing BPNs 110. This means that if the load on the blockchain network 118 increases or decreases, the blockchain network can dynamically increase or decrease in size to accommodate the changing load.

In an embodiment, all or substantially all nodes (i.e. BPNs 110) of blockchain network 118 are controlled by a blockchain service provider that is separate from the service providers of the SDNs 102. That is, in this embodiment, the blockchain network 118 is operated and managed by an entity separate from the entity that controls one or more of the SDNs 102.

The BPN comprises a registration list 112 and a copy of a distributed blockchain 114. The registration list 112 is a list of devices that have permission to interact with the blockchain 114. The list may include a device identifier of each registered device. The list may also include a public key of each registered device. An interaction may be, for example, a request for information stored on the blockchain 114 or a request modification of the blockchain 114. The modification may be, for example, an addition of a block 202 (see FIG. 2) to the blockchain 114. Before allowing a device to interact with the blockchain network 118, the BPN 110 determines whether the device is a registered device by checking whether the device identifier and/or public key are listed within the registration list 112. Because a device needs permission to interact with the blockchain 114, the blockchain 114 may be referred to as a "permissioned" blockchain. The permissioned distributed blockchain 114 is described in detail with reference to FIG. 2, below.

In an embodiment, each registration list 112 includes only devices that have explicitly registered with the BPN 110 containing that registration list 112. That is, a device that registers with the BPN $110_1$ is not necessarily registered with the BPN $110_2$, and vice versa. In one embodiment, a device must explicitly register with a BPN 110 in order to be placed on the registration list 112 of that BPN 110. In a second embodiment, a synchronization mechanism exists such that a device that registers with one of BPNs 110 is also automatically registered with all or substantially all the BPNs 110 of the blockchain network 118. In a third embodiment, information within registration lists 112 is instead stored on the distributed blockchain 114, and the BPN 110 checks the blockchain 114 to determine whether a device is a registered device. In this third embodiment, the registration list 112 is not needed.

Although BPNs 110 are shown as located outside of SDNs 102, in an embodiment, an SDN 102 may contain a BPN 110 that is controlled by the service provider of that SDN 102, and that BPN 110 may be a node within both the SDN 102 and within the blockchain network 118. In this embodiment, the blockchain network 118 extends within the SDN 102.

Figure 2:
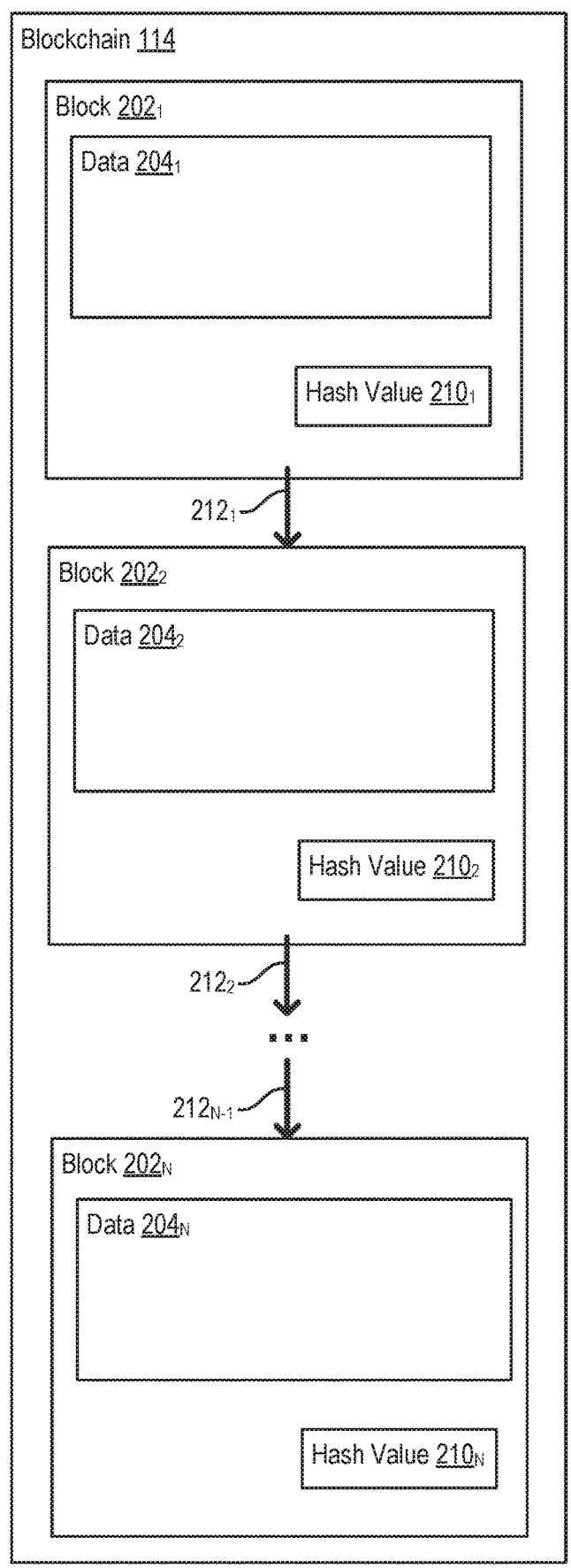
FIG. 2 depicts a block diagram of an exemplary distributed blockchain, according to an embodiment.

FIG. 2 depicts a block diagram of an exemplary distributed blockchain 114, according to an embodiment. Blockchain 114 is a distributed data structure, a copy of which is located at one or more locations throughout the blockchain network 118. As used herein, a "copy" of distributed blockchain 114 may be a full copy or a partial copy. The locations of copies of blockchain 114 may be memory or storage locations associated with BPNs 110. Each copy of blockchain 114 is synchronized with other copies within blockchain network 118 using a consensus mechanism. The consensus mechanism may be, for example, proof-of-elapsed-time, simplified byzantine fault tolerance, proof-of-work, proof-of-stake, proof-of-authority, or another mechanism. The consensus mechanism provides security to the blockchain network 118. For example, if a malicious entity tampers with one copy or a few copies of the blockchain 114, the tampered (modified by malicious entity) copies are discarded and the untampered (unmodified by malicious entity) copies are used by blockchain network 118.

The blockchain 114 is a data structure used for storage of data. The blockchain 114 comprises one or more data blocks 202 connected by pointers 212. Each block 202 comprises data 204, a hash value 210, and a pointer 212. The data 204 may comprise various information, such as that described with reference to FIG. 3, below.

The hash value 210 is an output of a hash function, such as secure hash algorithm (SHA)-3, SHA-256, or Keccak256. The hash value 210 of the first block (i.e., block $202_1$) of the blockchain 114 results from hashing input that comprises data $204_1$. The hash value 210 of all subsequent blocks (i.e., blocks $202_2$-$202_N$) results from hashing input that comprises data 204 of a block as well as hash value 210 of the previous block. For example, the hash value $210_2$ is the output of a hash function, where the input of the hash function comprises data $204_2$ and hash value $210_1$. Because the input that results in hash value 210 comprises hash value 210 of the previous block, the structure of blockchain 114 can be authenticated and validated. If a malicious entity attempts to modify data 204 of any block 202 of blockchain 114, the modification will be noticed through a comparison of the hash value 210 of that block and a recalculation of hash value 210 using the same hash function and the same inputs as used for obtaining hash value 210 stored in that block. A copy of blockchain 114 containing an unauthorized modification is discarded through the blockchain consensus mechanism, and the copy is replaced by a copy without the unauthorized modification.

Each block 202 comprises a pointer 212, which may be an address within a memory or storage containing the copy of blockchain 114. The first block of the blockchain 114 (i.e., block $202_1$) contains the pointer $212_1$, which points to the location in storage or memory containing the next block of the blockchain 114 (i.e., block $202_2$). The last block of blockchain 114 (i.e., block $202_N$) has pointer 212 with a null value, or alternatively, does not have pointer 212.

Figure 3:
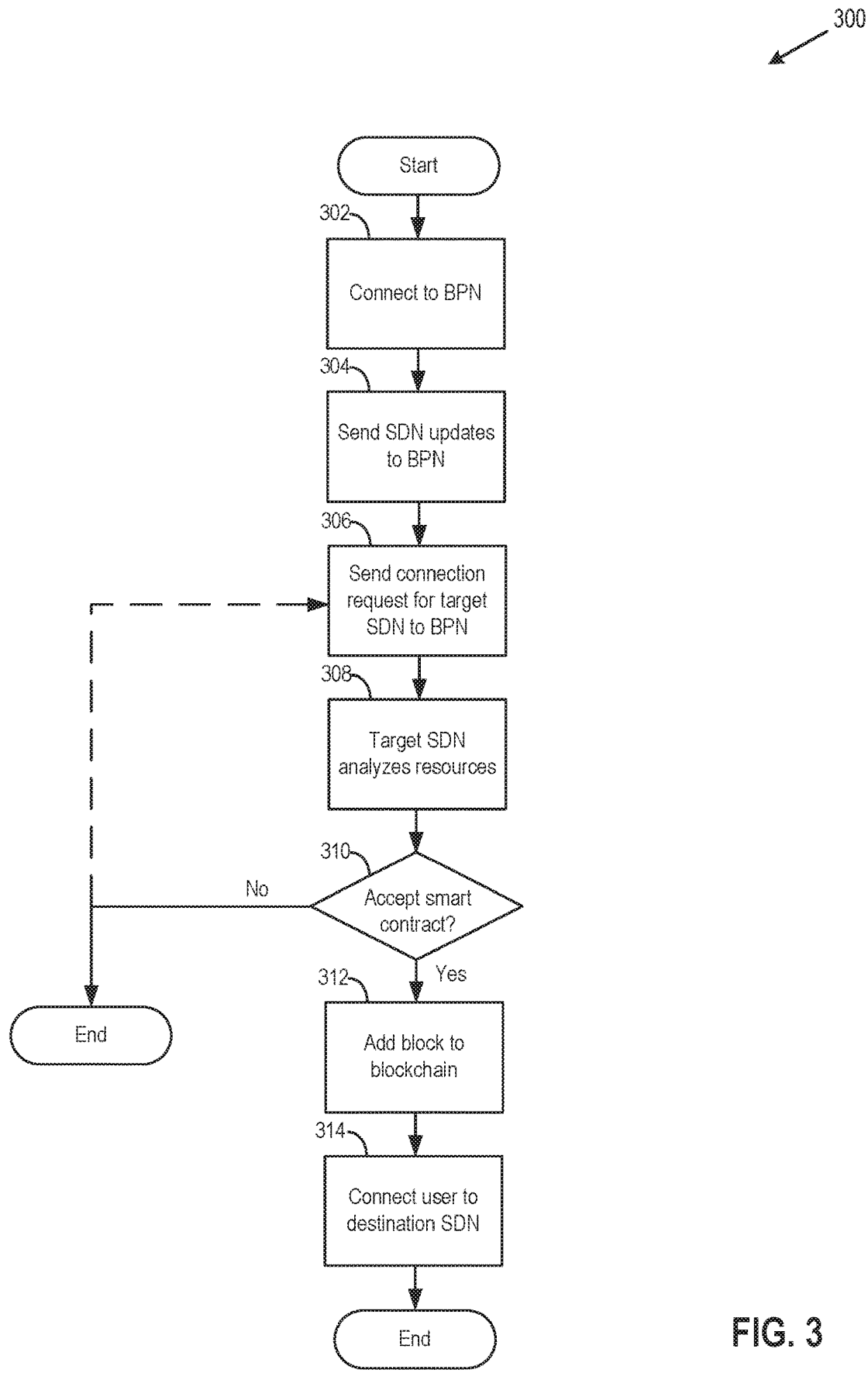
FIG. 3 depicts a flow diagram of a method of connecting a user device to a network, according to an embodiment.

FIG. 3 depicts a flow diagram of a method 300 of connecting a user device to an SDN 102, according to an embodiment. The method 300 is triggered when the user device 116 needs to connect to a different SDN 102 than the SDN 102 with which user device 116 has a service contract, such as an SLA. The reason may vary, such as load balancing or changing location to an area where the service provider of the user device 116 does not have good connectivity or where the service provider does not operate. To illustrate the method 300, an example will be provided. The method 300 is not limited to this example. In the example, the user device 116 is a mobile phone. The user device 116 is moving from country A, where service provider A operates, into country B, where service provider A does not operate, but where service provider B operates. Service provider A operates the SDN $102_1$ and service provider B operates the SDN $102_2$. The user of the user device 116 has an agreement with service provider A. By this agreement, service provider A agrees to provide user device a certain downlink and uplink data transfer speed. Service provider A and service provider B also have an agreement with one another, by which service provider B agrees to provide telephone network services to customers of service provider A who cross into country B. Service provider B has agreed to provide telephone network services as long as service provider B has sufficient resources to meet the downlink and uplink transfer speed requirements of customers of service provider A.

At block 302, the controller $106_1$ connects to blockchain network 118 The connection may be in response to controller 106 receiving a transmission from user device 116 indicating that user device 116 would like to connect to the SDN $102_2$. The transmission may include information such as, for example, that user device 116 is losing network signal or connectivity with the SDN $102_1$ but is gaining network signal of the SDN $102_2$.

To connect to the blockchain network 118, the controller $106_1$ connects to one of the BPNs 110. In an embodiment, the controller $106_1$ connects to the BPN 110 that is closest to the controller $106_1$. Closeness may be measured in terms of geographical distance, in terms of the number of "hops" needed to reach that BPN 110, in terms of latency of data transmission to that BPN 110. Closeness may also be measured in terms of "cost" of data transmission to a BPN 110, and the cost may be, for example, a dollar amount cost of transmitting data to that BPN 110. A hop may be a device that routes or forwards a network packet along a network path. For the purpose of the example, the controller $106_1$ connects to the BPN $110_1$.

If the controller $106_1$ has not previously registered with the blockchain network 118 or with the BPN 110 to which the controller $106_1$ is attempting a connection, then the controller $106_1$ registers with the BPN $110_1$. Registration may include information such as a device identifier of the controller $106_1$, public key or hash of the public key of the controller $106_1$, an identifier associated with SDN $102_1$, and authentication information such as a username and password pair associated with SDN $102_1$. If the controller $106_1$ has previously registered with the BPN $110_1$, the BPN $110_1$ authenticates the controller $106_1$ without a registration process. The connection established between the controller $106_1$ and the BPN $110_1$ may be a secure connection, such as an Internet Protocol Security (IPSec) connection.

Optionally, block 302 may be performed by the user device 116 rather than controller $106_1$. That is, the user device 116 may connect directly to the blockchain network 118 to perform the functions performed by controller $106_1$ described above and below in the following blocks of the method 300. The user device 116 may query the controller $106_1$ for information of the SDN $102_1$ used by the user device 116.

At block 304, the controller $106_1$ sends updates of the SDN $102_1$ to the BPN $110_1$. The updates may include registration of devices with the blockchain network 118, the devices being located within or being connected to the SDN $102_1$. Registration of a device allows that device to interact with the blockchain 114 without necessarily transmitting data, requests, or commands through the controller $106_1$. The updates may be transmitted by the user device 116 rather than the controller $106_1$. In one embodiment, block 304 is optional.

At block 306, the controller $106_1$ sends a request to a target or destination SDN 102, requesting the target SDN 102 to allow the user device 116 to connect to target SDN 102. For the purpose of illustrating the method 300, the SDN $102_2$ is chosen as target SDN 102. The request is sent to the SDN $102_2$ by sending the request to the BPN $110_2$. The controller $110_1$ does not need to know an address of the SDN $102_2$. The controller $110_1$ may send a request to one of BPNs 110, and the request is handled by the blockchain network 118 to ensure the request reaches its intended destination. The request may include an identifier of target SDN $102_2$, indicating the SDN $102_2$ as the destination SDN of the request. In an embodiment, controller $106_1$ sends the request to the BPN 110 that is located closest to controller $106_1$ and/or to SDN $102_1$. In a second embodiment, the controller $106_1$ sends the request to the BPN 110 that is located closest to the destination controller $110_2$ and/or to the destination SDN $102_2$. In this second embodiment, the controller $106_1$ may be aware of what BPN 110 is closest to target SDN $102_2$. In this second embodiment, the controller $106_1$ may already be registered with the BPN 110 that is closest to target SDN $102_2$.

In an embodiment, rather than the request being sent by controller $106_1$ on behalf of user device 116, user device 116 may itself send the request as described above with reference to controller $106_1$.

The request may include information, parameters, and data objects. For the example, the request may include an identifier of the device that would like to connect to target SDN $102_2$. Following the above example, the request may include an identifier of user device 116. The request may include a public key or hash of a public key of the device associated with the device identifier. The device identifier may be an "address" of the device, as used on blockchain network 118. The address may be generated from the public key by methods known in the art, such as by hashing the public key through one or more hash algorithms and optionally appending a checksum or a portion of a checksum of the resulting hash value to the resulting hash value. Following the example, the request may include a public key associated with user device 116.

The request may include parameters representing provisioning requirements, such as the required downlink and uplink data transfer speeds for the device (e.g., user device 116) associated with the identifier. The request may include specific parameters for resources that are allocated to the device associated with the identifier. The resource parameters may state, for example, that the user device 116 requested a certain number of central processing units or a percent of a central processing unit to be allocated to user device 116. The request may include a copy of the SLA between the user of the user device 116 and service provider A that controls SDN $102_1$. The request may also include a smart contract reflecting provisioning requirements and resource parameters. The smart contract is to be executed by service provider A and service provider B, and then recorded onto blockchain 114. In an embodiment, the smart contract may include provisioning requirements, resource parameters, and the SLA, removing the need to separately provide provisioning requirements, resource parameters, and the SLA within the request.

At block 308, the controller $106_2$ receives the request to connect to the user device 116. The controller $106_2$ parses through the request, such as through the smart contract, provisioning requirements, resource requirements, and/or SLA and analyzes the state of the SND $102_2$ to determine whether the SDN $102_2$ has the resources to satisfy the requirements of the request. For example, the controller $106_2$ may analyze the SDN $102_2$ to determine whether the SDN $102_2$ has sufficient central processing units to process the workloads of the user device 116. The controller $106_2$ may also analyze congestion within the SDN $102_2$, including latency and/or bandwidth, to determine whether the SDN $102_2$ can provide downlink and uplink speeds required by the user device 116.

At block 310, the controller $106_2$ determines whether to accept the received smart contract. If the controller $106_2$ determines that the SDN $102_2$ can satisfy the conditions or parameters of the request, then the controller $106_2$ accepts the smart contract. As part of accepting the contract, the controller $106_2$ sends an acceptance message to the controller $106_1$ (or to the user device 116). The message is sent from the controller $106_2$ to the BPN $110_2$, and the blockchain network 118 routes and forwards the message to the BPN $110_1$, which then transmits the message to the controller $106_1$. If the controller $106_2$ accepts the smart contract, the method 300 continues to block 312.

If the controller $106_2$ determines that the SDN $102_2$ cannot satisfy the conditions or parameters of the request, the SDN $102_2$ rejects the smart contract. As part of rejecting the contract, the controller $106_2$ may send a rejection message to the controller $106_1$ (or to the user device 116), and the message is transmitted through the blockchain network 118 similarly to the transmission of an acceptance message, described above. If the controller $106_2$ rejects the smart contract, then the method 300 either ends or returns to block 306, depending on implementation of the method 300. The method 300 may return to block 306 to attempt connecting the user device 116 to a different SDN 102, such as to the SDN $102_N$.

At block 312, the smart contract agreed to by the controller $106_1$ and the controller $106_2$ is added to the data 204 of a block 202, and the block 202 is added to a copy of distributed blockchain 114. The added block 202 is synchronized using the consensus mechanism of blockchain 114. The block 202 may be added by any of the BPNs 110. The request to add the block 202 to the blockchain 114 may be sent to one of the BPNs 110 by the controller $106_1$, the controller $106_2$, the user device 116, or a combination of these. In addition to the smart contract being added to the data 204 of the block 202, other information may be added to the data 204, such as the SLA, and any resource or provisioning requirement parameters that were included as part of the request of block 306.

At block 314, the user device 116 connects to the SDN $102_2$. As part of block 314, the user device 116 may disconnect from the SDN $102_1$. After block 314, the method 300 ends.

Figure 4:
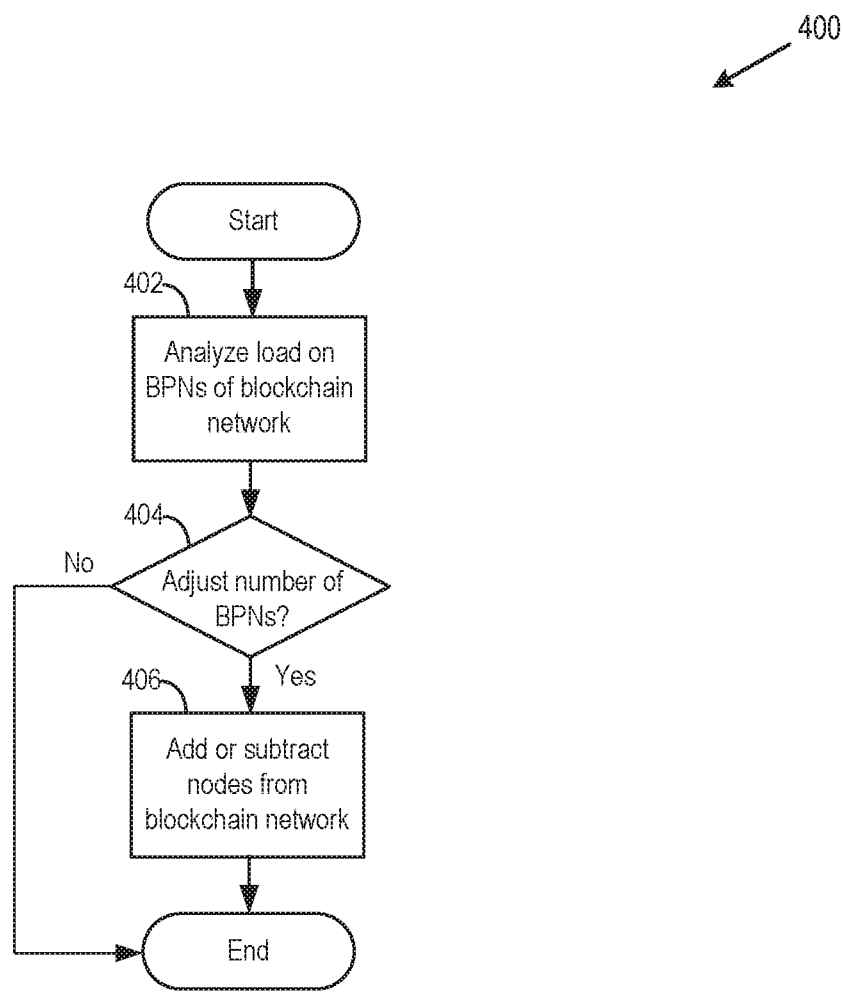
FIG. 4 depicts a flow diagram of a method of dynamically scaling a blockchain network, according to an embodiment.

FIG. 4 depicts a flow diagram of a method 400 of dynamically scaling a blockchain network 118, according to an embodiment. The consensus mechanism of the distributed blockchain 114 can make the blockchain network 118 and the computing system 100 inherently secure. The method 400 adds scalability to blockchain network 118, and this scalability adds scalability to the computing system 100. The method 400 may be performed by any entity, such as an entity within blockchain network 118, that has permissions to reconfigure blockchain network 118. For example, one of BPNs 110 may be designated as a "controller" node, and this BPN 110 performs the method 400. Alternatively, any of the BPNs 110 may perform the method 400. In the embodiment described below, the method 400 is performed by one of the BPNs 110. The method 400 may be performed periodically, such as for example, every second, every minute, every hour, every day, or every week.

At block 402, the BPN 110 analyzes the load on each of the BPNs 110 within the blockchain network. The BPN 110 determines whether any of the BPNs 110 are overloaded, such as from requests by the controllers 106 or the user devices 116 while performing the blocks of the method 300. The BPN 110 also determines whether any of the BPNs 110 are underutilized.

At block 404, the BPN 110 determines whether BPNs 110 should be added to the blockchain network 118, whether BPNs 110 should be removed from the blockchain network 118, or whether the number of BPNs 110 should remain the same. For example, if certain BPNs 110 are underutilized, then the BPN 110 may determine that the underutilized BPNs 110 may be removed from the network. If certain BPNs 110 are overloaded, then the BPN 110 may determine to add BPNs 110 close to the overloaded BPNs 110 so as to perform some of the load of the overloaded BPNs 110.

If the BPN 110 determines that the number of the BPNs 110 in the blockchain network 118 should stay the same, then the method 400 ends. If the BPN 110 determines that the number of the BPNs 110 in the blockchain network 118 should be adjusted, then the method 400 continues to block 406.

At block 406, the BPN 110 adjusts the number of BPNs 110 within the blockchain network 118 by adding or removing BPNs 110. For example, if the BPNs 110 are virtual appliances, the BPN 110 may instantiate additional BPNs 110 on host machines, or BPN 110 may power down BPNs 110. After block 406, the method 400 ends.

It should be noted that for any process described herein, additional or fewer blocks may be performed in similar or alternative orders, or in parallel, within the scope of the various embodiments described herein, consistent with the teachings herein, unless otherwise stated.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
    connecting a device connected to a first software defined network to a blockchain network, wherein the blockchain network comprises a distributed blockchain;
    sending from the device to the blockchain network a request to connect the device to a second software defined network while the device is connected to the first software defined network, wherein the first software defined network is not registered with the blockchain network when the device sends the request to the blockchain network, the method further comprising registering at least one node of the first software defined network with at least one node of the blockchain network before the blockchain network sends the request to the second software defined network, and wherein the request comprises a smart contract and the smart contract comprises network provisioning requirements of the device;
    sending the request from the blockchain network to the second software defined network;
    adding to the distributed blockchain a block comprising the smart contract; and
    connecting the device to the second software defined network.

2. The method of claim 1, the method further comprising, before connecting the device to the second software defined network, determining whether the second software defined network can satisfy the network provisioning requirements of the device, and based on the determining, performing the adding to the distributed blockchain the block comprising the smart contract.

3. The method of claim 1, the method further comprising analyzing load on one or more nodes of the blockchain network, and in response to the analyzing, performing one of (a) adding a node to the one or more nodes, or (b) removing a node from the one or more nodes.

4. The method of claim 1, the method further comprising receiving the request, accepting the smart contract, and transmitting an acceptance message.

5. The method of claim 1, wherein the sending to the blockchain network the request comprises sending the request to a node of the blockchain network that is located closest to the first software defined network.

6. The method of claim 1, wherein the sending to the blockchain network the request comprises sending the request to a node of the blockchain network that is located closest to the second software defined network.

7. The method of claim 1, wherein the request further comprises an identifier of the device and a public key of the device, wherein the request is sent to a first node of the blockchain network with which the device has previously registered, the first node including a first registration list including the identifier and the public key, wherein the first registration list is maintained independently of a second registration list on a second node of the blockchain network that does not include the identifier or the public key.

8. The method of claim 1, the method further comprising disconnecting the device from the first software defined network.

9. The method of claim 1, wherein the device is registered with a first node of the blockchain network and is not registered with a second node of the blockchain network, wherein the request is explicitly routed to the first node and not the second node.

10. A non-transitory computer readable medium comprising instructions to be executed in a processor of a computer system, the instructions when executed in the processor cause the computer system to carry out a method comprising:
    connecting a device connected to a first software defined network to a blockchain network, wherein the blockchain network comprises a distributed blockchain;
    sending from the device to the blockchain network a request to connect the device to a second software defined network while the device is connected to the first software defined network, wherein the request comprises a smart contract and the smart contract comprises network provisioning requirements of the device and;
    an identifier of the device and a public key of the device, wherein the request is sent to a first node of the blockchain network with which the device has previously registered, the first node including a first registration list including the identifier and the public key, wherein the first registration list is maintained independently of a second registration list on a second node of the blockchain network that does not include the identifier or the public key;
    sending the request from the blockchain network to the second software defined network;
    adding to the distributed blockchain a block comprising the smart contract; and
    connecting the device to the second software defined network.

11. The non-transitory computer readable medium of claim 10, the method further comprising, before connecting the device to the second software defined network, determining whether the second software defined network can satisfy the network provisioning requirements of the device, and based on the determining, performing the adding to the distributed blockchain the block comprising the smart contract.

12. The non-transitory computer readable medium of claim 10, the method further comprising analyzing load on one or more nodes of the blockchain network, and in response to the analyzing, performing one of (a) adding a node to the one or more nodes, or (b) removing the node from the one or more nodes.

13. The non-transitory computer readable medium of claim 10, the method further comprising receiving the request, accepting the smart contract, and transmitting an acceptance message.

14. The non-transitory computer readable medium of claim 10, the method further comprising registering at least one node of the first software defined network with at least one node of the blockchain network.

15. The non-transitory computer readable medium of claim 10, wherein the sending to the blockchain network the request comprises sending the request to a node of the blockchain network that is located closest to the first software defined network.

16. The non-transitory computer readable medium of claim 10, wherein the sending to the blockchain network the request comprises sending the request to a node of the blockchain network that is located closest to the second software defined network.

17. The non-transitory computer readable medium of claim 10, wherein the request further comprises an identifier of the device and a public key of the device.

18. The non-transitory computer readable medium of claim 10, the method further comprising disconnecting the device from the first software defined network.

19. A computer system comprising:
a processor, wherein the processor is programmed to carry out a method for the computer system to:
connect to a blockchain network comprising a distributed blockchain, while connected to a first software defined network;
send to the blockchain network a request to connect to a second software defined network while connected to the first software defined network, wherein the computer system is registered with a first node of the blockchain network and is not registered with a second node of the blockchain network, wherein the request is explicitly routed to the first node and not the second node, wherein the request comprises a smart contract and the smart contract comprises network provisioning requirements of the computer system that directs the blockchain network to:
send the request from the blockchain network to the second software defined network; and
add a block comprising the smart contract to the distributed blockchain; and
connect to the second software defined network in response to the block comprising the smart contract being added to the distributed block chain.

\* \* \* \* \*